United States Patent
Cordani

(10) Patent No.: US 9,649,518 B2
(45) Date of Patent: May 16, 2017

(54) WIND TURBINE FIRE SUPPRESSION SYSTEM

(71) Applicant: GelTech Solutions, Inc., Jupiter, FL (US)

(72) Inventor: Peter Cordani, Palm Beach Gardens, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 13 days.

(21) Appl. No.: 14/938,946

(22) Filed: Nov. 12, 2015

(65) Prior Publication Data
US 2016/0129289 A1    May 12, 2016

Related U.S. Application Data

(60) Provisional application No. 62/078,463, filed on Nov. 12, 2014.

(51) Int. Cl.
| | |
|---|---|
| *A62C 2/00* | (2006.01) |
| *A62C 3/00* | (2006.01) |
| *A62C 3/16* | (2006.01) |
| *F03D 80/00* | (2016.01) |
| *F03D 80/80* | (2016.01) |

(52) U.S. Cl.
CPC ............ *A62C 3/16* (2013.01); *F03D 80/00* (2016.05); *F03D 80/80* (2016.05); *F05B 2270/107* (2013.01); *Y02E 10/72* (2013.01)

(58) Field of Classification Search
CPC . A62C 3/16; F03D 80/00; F03D 80/80; F05B 2270/107; Y02E 10/72
USPC .................... 169/46, 54, 56, 60, 61
See application file for complete search history.

(56) References Cited

U.S. PATENT DOCUMENTS

| | | | |
|---|---|---|---|
| 5,190,110 A | 3/1993 | von Blucher et al. | |
| 5,849,210 A | 12/1998 | Pascente et al. | |
| 5,989,446 A | 11/1999 | Hicks et al. | |
| 7,096,965 B2 | 8/2006 | Ozment | |
| 7,104,336 B2 | 9/2006 | Ozment | |
| 2013/0307270 A1* | 11/2013 | Steen | F03D 80/00 290/44 |
| 2014/0083723 A1* | 3/2014 | Danielsen | A62C 3/16 169/45 |

* cited by examiner

*Primary Examiner* — Justin Jonaitis
(74) *Attorney, Agent, or Firm* — McHale & Slavin, P.A.

(57) ABSTRACT

A system for suppressing a wind turbine fire using an admixture of hydrated super absorbent polymer having properties for suppressing and extinguishing of a fire. The admixture is non conductive and, upon drying, leaves a non-conductive residual that can be vacuumed from the wind turbine components to allow salvaging of the wind turbine components. The admixture is maintained within a pressurized storage vessel having a solenoid that is released by temperature sensor applying the admixture through strategically positioned nozzles to the control cabinets, generator, gearbox and bearings for extinguishment of any associated fire. Since the admixture of super absorbent polymer and water entraps the particulates and noxious and/or toxic gasses, the clean-up is substantially easier and quicker than the clean up from other methods of fire suppression and extinguishing.

11 Claims, 1 Drawing Sheet

WIND TURBINE FIRE SUPPRESSION SYSTEM

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/078,463, entitled "WIND TURBINE FIRE SUPPRESSION SYSTEM", filed Nov. 12, 2014. The contents of the above referenced application is incorporated herein by reference.

FIELD OF THE INVENTION

This invention relates to the field of fire prevention, and more particularly to a wind turbine fire suppression system containing a super absorbent polymer to address electrical fires within the motor enclosure.

BACKGROUND OF THE INVENTION

Electrical fires can quickly destroy a wind turbine and is the one of the leading causes of accidents in wind turbines. Wind turbines catch fire because highly flammable materials such as hydraulic oil and plastics are in close proximity to machinery and electrical wires. These can ignite a fire if they overheat or are faulty. Lots of oxygen, in the form of high winds, can quickly fan a fire inside a turbine. Once ignited, the chances of fighting the blaze are slim due to the height of the wind turbine and the remote locations that they are often in.

Main causes of fire ignition in wind turbines include electrical malfunction, mechanical failure, errors with maintenance and lightning strikes. For instance, a known problem is the production of stray shaft currents which may occur within the generators commonly used in wind turbines. The existence of large currents within a generator's bearings can lead to accelerated component wear and rapid failure. High-frequency currents, induced in the shaft of an induction generator through parasitic capacitive coupling, can reach levels of 60 amps and 1200 volts or greater.

Bearing damage has become a critical failure issue. If the bearings are oversized, they will last longer but the increase in friction reduces turbine efficiency. Smaller bearings allow for greater turbine efficiency but are more susceptible to overload conditions that can result in catastrophic destruction of the bearings.

In a wind turbine, a stator is directly connected to the grid, while a rotor is fed by an integrated gate bipolar transistor voltage-source inverter. The rotor-side converter regulates the electromagnetic torque and supplies part of the reactive power to maintain the constant voltage and frequency of the stator output. This arrangement makes operation at varying wind speeds possible while maintaining a constant stator voltage and a constant frequency output to the grid. The high-frequency switching introduces rotor-shaft voltages-exposing bearings, gearboxes, and other critical generator components to high-frequency currents. Inadequate generator-shaft grounding significantly increases the possibility of bearing damage. Without proper grounding, electrical discharges begin at start-up and grow progressively worse which causes concentrated pitting, friction and associated wear. Attached equipment, such as gearboxes, frequently end up with bearing damage of their own. Conductive grease is a common practice used to help bleed off harmful currents by providing a lower impedance path through the bearings, however, the conductive particles in the grease increase mechanical wear.

U.S. Pat. No. 7,096,965 discloses a method of proportioning a foam concentrate into a non-flammable liquid to form a foam concentrate/liquid mixture and create a flowing stream of the foam concentrate/liquid mixture. Nitrogen is introduced into the stream of the foam/liquid mixture to initiate the formation of a nitrogen expanded foam fire suppressant. The apparatus of this invention is adapted for expanding and dispensing foam and includes a housing defining an interior through which extends a discharge line.

U.S. Pat. Nos. 7,096,965 and 7,104,336 discloses a method and apparatus for proportioning foam concentrate into a non-flammable liquid to form a foam concentrate/liquid mixture.

U.S. Pat. No. 5,989,446 discloses a water additive for use in fire extinguishing and prevention. The additive comprises a cross-linked water-swellable polymer in a water/oil emulsion. The polymer particles are dispersed in an oil emulsion wherein the polymer particles are contained within discrete water "droplets" within the oil.

U.S. Pat. No. 5,190,110 discloses the fighting of fires or protection of objects from fire by applying water which comprises dispersing in the water particles of a cross-linked, water-insoluble, but highly water-swellable, acrylic acid derivative polymer in an amount sufficient to raise the viscosity.

U.S. Pat. No. 5,849,210 discloses a method of preventing or retarding a combustible object from burning including the steps of mixing water with a super absorbent polymer ("SAP") to form one at least partially hydrated SAP, and applying the at least partially hydrated SAP to the combustible object, before or after combustion.

What is needed in the art is a system for use with wind turbines that can be used to stop a fire before it takes hold or gets out of control.

SUMMARY OF THE INVENTION

A system for suppressing a wind turbine fire. The system provides an admixture of hydrated super absorbent polymer having properties for suppressing and extinguishing of a fire. The admixture is non conductive and, upon drying, leaves a non-conductive residual that can be vacuumed from the wind turbine components to allow salvaging of the wind turbine components. Should an unacceptable heat build-up, arcing, or fire occur, the admixture is strategically applied to control cabinets, generator, gearbox and bearings to immediately extinguish any associated fire. Since the admixture of super absorbent polymer and water entraps the particulates and noxious and/or toxic gasses, the clean up is substantially easier and quicker than the clean up from other methods of fire suppression and extinguishing. Further, if the admixture is sprayed onto the ground, the mixture is non-toxic and is a formula that helps plant growth by retaining moisture.

The admixture can saturate the area and presents an ability to cling to object to which it has been applied and both cool down the components after it is on fire and creates a block to inhibit fire spreading over the object. The hydrated super absorbent polymer mixture has a viscosity and is distributed in a manner to be contained within a specific area without spreading to adjacent areas and turns water, which is normally conductive of electricity, non-conductive. These superior properties enable even electrical fires to be extinguished more rapidly and not flare back up. The hydrated super absorbent polymer is also known to encapsulate noxious and toxic gases produced by electrical fires.

Accordingly, it is an objective of the present invention to provide a receptacle for placement of non-conductive water hydrated super absorbent polymer for extinguishment of wind turbine fires.

Still another objective of the present invention is to provide a fire extinguisher wind turbines that, upon application and drying, leaves a residual that can be removed by vacuuming.

It is still another objective of the present invention to provide an admixture of super absorbent polymer and water which has viscosity that does not enable it to not flow readily and will retain a shape for a period of time. The viscosity also enables the admixture to adhere to horizontal, vertical, inclined, and on curved surfaces.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
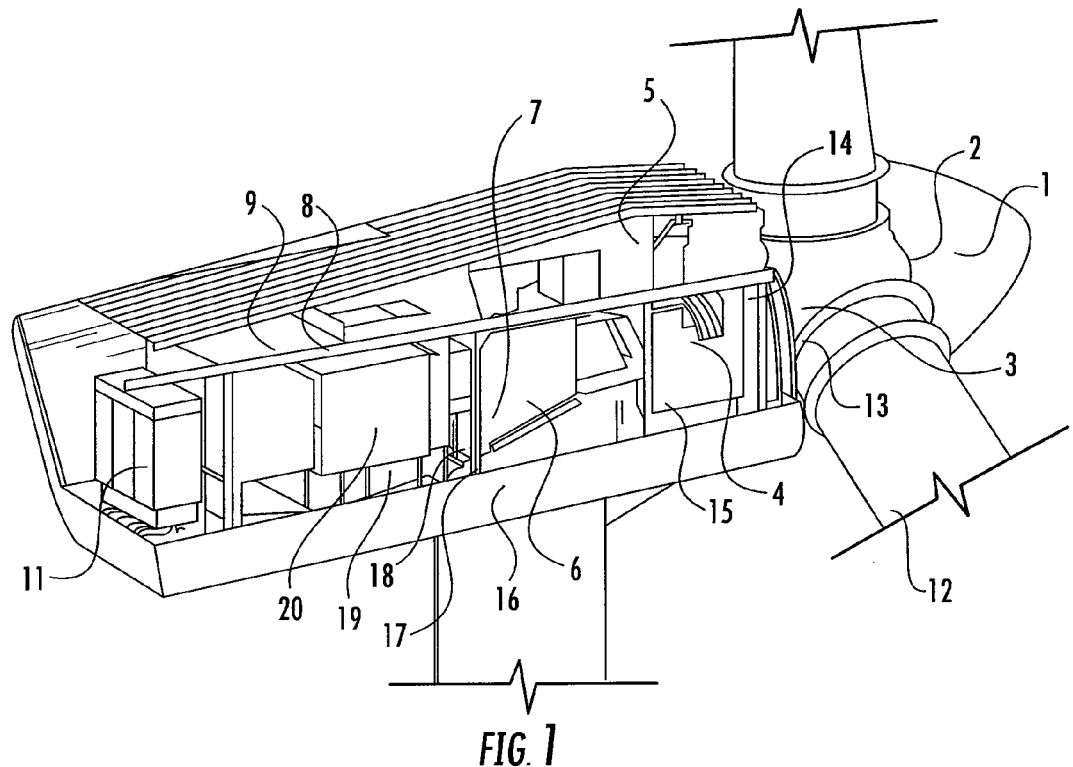
FIG. 1 is a pictorial view of a wind turbine machinery.
Figure 2:
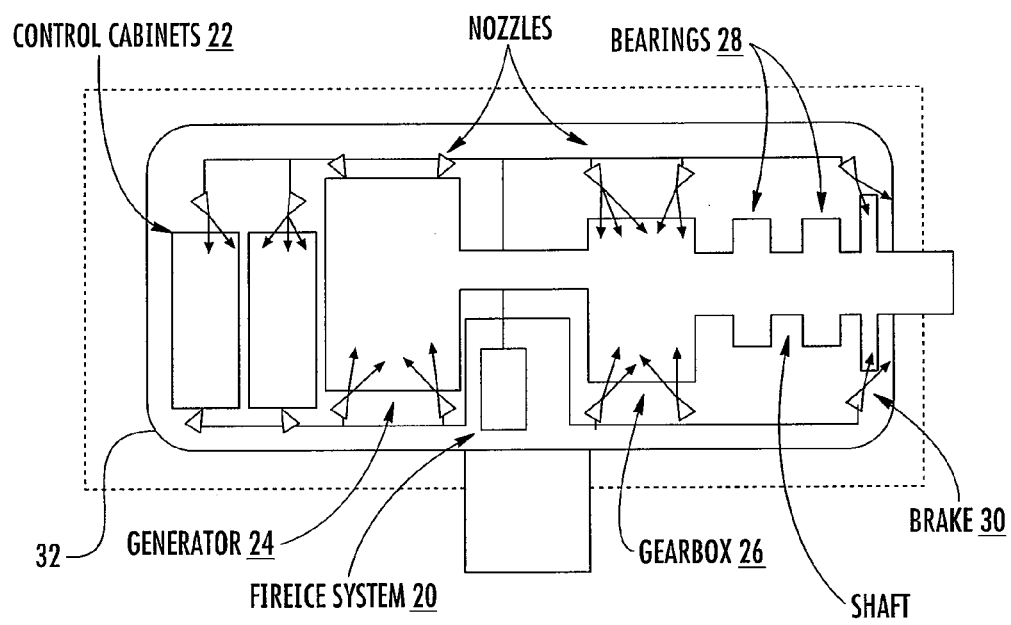
FIG. 2 is a pictorial view of fire suppression system placed with the wind turbine enclosure.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention utilizes a super absorbent polymer in water in an amount sufficient to extinguish a wind turbine fire and suppress the spread of the fire. The present invention utilizes biodegradable, super absorbent, aqueous based polymers. Wind turbine fires present different and unique problems pertaining to how these fires should be extinguished and suppressed. Wind turbines having a 45 m diameter blade can have a gear box located about 80 m AGL and a total height of about 125 m. Should a fire occur within the gear box, fire fighter would have to travel to the wind turbine and then configure equipment capable of reaching at least 80 m from the ground. Wind turbines are typically located in remote areas making the ability of a conventional fire truck timely reaching the location nearly impossible. Fire fighting from a helicopter can be just a problematic since the blades extend upward from the gear box and could still be turning.

Known fire fighting techniques such as gaseous discharge are effective but require a sealed area to operate. Creating a tight seal on a control box is expensive and can create additional heat related problems since the machinery requires heat dissipation. Water is commonly used element to fight fires because it can quickly cool down burning material. However, straight water does not necessary work on a wind turbine fire as it is conductive and if applied on an electrical circuit or electronic component can create an electrical short circuit can result in total destruction of the circuit.

In the preferred embodiment of the present invention, an admixture of a super absorbent polymer and water is placed within a vessel for ready release over the machinery. The aqueous admixture of the super absorbent polymer and water having properties which enable the super absorbent polymer and water admixture to be confined to a particular area because of its relatively high viscosity. The properties of the admixture, in particular its viscosity, enable the admixture to remain on vertical, horizontal, and curved surfaces of the machinery, namely the control cabinets, generator, gearbox and bearings. Unlike straight water, the admixture does not provide an electrically conductive path. The present invention adds a predetermined amount of super absorbent polymer to a predetermined amount of water to obtain an admixture which has properties that enable the admixture to suppress the spread of a wind turbine fire.

The super absorbent polymer is preferably potassium based and marketed under the trademark FireIce® which is admixed with water creating physical and chemical properties which enable the admixture to entrap and retain the noxious and/or toxic gasses and prevent the release of these gases into the atmosphere. A suggested ratio of about 4 grams of said super absorbent polymer is hydrated with about 0.1 gallons of water to suppress and extinguish turbine fires. In particular the preferred embodiment of super absorbent polymer is an mixture of polyacrylamides/potassium acrylate. Other suitable polymers are cross-linked modified polyacrylamides/sodium acrylate, carboxy-methylcellulose, alginic acid, cross-linked starches, and cross-linked polyamino acids.

The preferred embodiment stores the admixture in a pressurized container for release through the strategically positioned nozzles.

Referring now to the Figures, disclosed is a conventional wind turbine having a hub controller 1 with blade pitch cylinders 2 and a blade hub 3. The blades 12 are mounted with bearings 13 to a shaft 4 with having an oil cooler 5 coupled to a gear box 6. A braking system 7 similar to an automotive disc brake prevents excessive blade rotation speed. A high voltage transformer 11 is coupled to a generator 19.

The system includes at least one container 20 having a predetermined amount of hydrated super absorbent polymer. The container 20 has an outlet with a solenoid valve coupled to nozzles strategically positioned in the control cabinets 22, generator 24, gearbox 26, bearing 28 and braking system 30. The solenoid is operated by heat sensors placed adjacent to items known to arc when conditions are right for fire ignition. In a preferred embodiment, the heat sensor is a fixed temperature detector with no thermal lag. The machinery is placed within an enclosure 32 that allows for a controlled distribution of the fire suppression material despite environmental weather conditions. The admixture disclosed herein maintains a leakage below 0.9 mA at 15 feet for 11,000 volts and 20 feet for 30,000 volts.

The container includes at least one propellant tank having a predetermined amount of compressed gas coupled to the container by a gas conduit. A valve is positioned in the gas conduit between the propellant tank operable to allow gas to charge the hydrated super absorbent polymer in order to be delivered to the spray nozzles. The container 30 is always charged with compressed gas and a regulator is positioned in the gas conduit to allow the gas to flow at a predetermined pressure. The gas is supplied at a predetermined pressure and volume to allow the admixture of super absorbent polymer to discharge at a rate to provide coverage in the spray pattern for a time sufficient to create a cooling effect while the braking system is applied to stop the blade from spinning to eliminate the generator from creating current. It is contemplated that a two minute discharge of the admixture of super absorbent polymer would be sufficient however a longer or shorter duration could be utilized without deviating from the scope of the invention.

The admixture is non-conductive and capable of suppressing harmful air emission released from electrical fires. A test of the admixture has been performed on electrical fires involving copper and aluminum cables.

1. Test Description

A total of five field test air sampling collections were undertaken on Jan. 18, 2011, at the High Current Laboratory (HCL) to evaluate the air emissions released from the application of Applicant super absorbent polymer marked under the trademark FireIce® to artificially faults generated using copper and aluminum cables. The five test scenarios were air sampled for airborne metals and organics. The description of the tests is given in Table 1.

sampling trains consisted of the following components and the air flow rate utilized:

1. A sampling train consisting of a MCE (mixed cellulose ester) filter in a cartridge filter holder for aerosol collection generated during the arc. The air flow rate through the filter was set to 1 L/min.

2. A sampling train for organic compounds using two Carbotrap™ 300 sampling tubes in series (front-back arrangement) was placed with the front sampling tube inlet at the edge of the concrete bunker. The air flow rate for the organics sampling tube train was 0.050 L/min.

3. A sampling train consisting of three impingers in series with 1M nitric acid in the first two impingers and an empty third impinger was used to trap airborne metals. The metals train air flow rate was set to 0.50 L/min.

4. A sampling train identical to the one described in 3 but with 0.5M KOH added to the first two impingers and an empty third impinger was setup plus an additional Carbotrap™ 300 organic compound sampling train as described in 2 was added in series to the outlet of the last impinger. The air sampling flow rate was set to 0.25 l/min for this train.

TABLE 1

Test description

| Test # | Shot # | Test description | Cable description |
|---|---|---|---|
| 1 | 119 | New cables with copper conductor artificially faulted to create arc with no FireIce ® added. Target fault current: 2 kA. Fault duration: until fault self-extinguished. | coned 500 kcmil Cu 600 V EAM/LSNH installed in coned precast concrete distribution box type B-3.6 |
| 2 | 120 | New cables with copper conductor artificially faulted to create arc with FireIce ® added at the on-set of arc. Target fault current: 2 kA. Fault duration: until fault self-extinguished. | coned 500 kcmil Cu 600 V EAM/LSNH installed in coned precast concrete distribution box type B-3.6 |
| 3 | 121 | New cables with copper conductor artificially faulted to create arc with FireIce ® added at the on-set of arc - this was a repeat of test #2 due to poor arc generation and non-propagation of arc. Target fault current: 2 kA. Fault duration: until fault self-extinguished. | coned 500 kcmil Cu 600 V EAM/LSNH installed in coned precast concrete distribution box type B-3.6 |
| 4 | 122 | New cables with aluminum conductor artificially faulted to create arc with FireIce ® added at the on-set of arc. | coned 350 MCM Al 600 V EPR installed in coned precast concrete distribution box type B-3.6 |
| 5 | 123 | New cables with aluminum conductor artificially faulted to create arc with "FireIce ®" added to concrete box to cover faulted cables prior to high current being applied to create arc. Target fault current: 2 kA. Fault duration: until fault self-extinguished. | coned 350 MCM Al 600 V EPR installed in coned precast concrete distribution box type B-3.6 |

In all the tests the cables were installed at the bottom of the concrete box, and the fault between the cables was created using a fuse wire. The approximate dimensions of the interior volume of the concrete box are: 33"×33"×24". One calorimeter was installed above the concrete box to measure the incident energy generated by the fault.

The sampling equipment consisted of five separate sampling trains, each with a sampling pump drawing air through various air sampling components using a calibrated mass flow controller to maintain constant flow. The sampling time for each train was two minutes during each of the 5 arc test scenarios. For each sampling train a flow rate was selected based on the type of air sample being collected. The five 5. A final sampling train consisting of 3 impingers in series as described in 3 but with KOH added to the first two impingers and an empty third impinger to capture acidic species possibly generated during the FireIce® tests. The air sampling flow rate was set to 0.25 L/min for this train.

2. Organic Compound Sampling Results—Carbotrap™ 300 Tube Analyses

The organic compounds released to air were captured using Carbotrap™ 300 tubes after the air sample passed through a KOH impinger train. The sampling flow rate was 0.25 L/min. The total mass of organic compounds collected during each of the five arc fault tests are given in Table 2. The organic compounds identified in the air samples are summarized in Table 3.

TABLE 2

Total Mass of Organic Compounds Collected on Carbotrap™ 300 Sample Tubes and Estimated FireIce® Inhibition Ratio for Organic Compound Release

| Test Number & Description | Total Mass of Organics Collected on Carbotrap™ 300 Tubes (ng) | Minimum Removal Efficiency Compared to Test 1 |
|---|---|---|
| 1 Pair of New Neoprene Copper Cables - No FireIce® Applied | 615 | — |
| 2 Pair of New Neoprene Jacketed Copper Cables - FireIce®- Added at On-Set of Arc | 189 | 3.2 |
| 3 Pair of New Neoprene Jacketed Copper Cables - FireIce®- Added at On-Set of Arc (Repeat) | 138 | 4.5 |
| 4 Pair of New Neoprene Jacketed Aluminum Cables - FireIce® Added at On-Set of Arc | No Organic Compounds Detected | >61.5* |
| 5 Pair of New Neoprene Jacketed Aluminum Cables - FireIce® Added Prior to Arc Generation | No Organic Compounds Detected | >61.5* |

Note:
*Assumed minimum removal efficiency is assumed to be >61.5 as detection limit for any single organic compound is 10 ng.

TABLE 3

Organic Compounds Identified in High Flow Samples

| Test Number & Description | Organic Compounds Collected on Carbotrap™ 300 Tubes Passage Through KOH Impingers | Total Organic Compound Mass (Front + Back) (ng) |
|---|---|---|
| 1 Pair of New Neoprene Copper Cables - No FireIce® Added | ethane-1-chloro-1,1 difluoro* | 48000* |
| | 2-butene, 2-methyl | 18 |
| | 1,3-butadiene, 2-methyl | 40 |
| | 1,3 pentadiene | 35 |
| | 1,4 pentadiene | 14 |
| | cyclopentane | 23 |
| | 1-pentene, 2-methyl | 36 |
| | benzene | 62 |
| | 1,4-cyclohexadiene | 25 |
| | 3-hexen-1-ol | 28 |
| | toluene | 237 |
| | ethylbenzene | 48 |
| | styrene** | 2740** |
| | a-methyl styrene** | 53** |
| 2 Pair of New Neoprene Jacketed Copper Cables - FireIce®- Added at On-Set of Arc | ethane-1-chloro-1,1-difluoro | 68* |
| | 1,3-butadiene | 14 |
| | 1-pentene, 2-methyl | 21 |
| | propane, 2-methyl-1-nitro | 31 |
| | 3-heptene | 8 |
| | benzene | 62 |
| | butane, I-chloro-2-methyl | 25 |
| | styrene** | 99** |
| | unknown | 28 |
| 3 Pair of New Neoprene Jacketed Copper Cables - FireIce®- Added at On-Set of Arc (Repeat) | ethane-1-chloro-1,1-difluoro | 264* |
| | 1-propene, 2-methyl | 16 |
| | 1,3-butadiene | 40 |
| | 2-butene, 2-methyl | 12 |
| | 1-pentene, 2-methyl | 25 |
| | benzene | 34 |
| | unknown | 11 |
| 4 Pair of New Neoprene Jacketed Aluminum Cables - FireIce® Added at On-Set of Arc | No organic compounds detected on both front and back Carbotrap™ 300 tubes | 0 |
| 5 Pair of New Neoprene Jacketed Aluminum Cables - FireIce® Added Prior to Arc Generation | No organic compounds identified on both front and back Carbotrap™ 300 tubes | 0 |

Notes:
*The ethane-1-chloro-1,1-difluoro is suspected to be contamination resulting from the partial decomposition of impinger train holder used during testing. The Freon HCFC 142b released during tests 1 to 3 is the trapped blowing agent used to make the closed cell foam. The foam was used to support and secure the impinger trains. Not included in organic compound mass reported.
**The styrene and a-methyl styrene are unintentional contaminants generated from the destruction of the aerosol filter holder used during the first arc fault Test-1. The filter-holder was too close to the arc-fault zone and did not survive Test-1. The styrene values are not included in organic compound mass reported.

Direct Air Sampling

The total mass of organic compounds in the air samples collected directly on to Carbotrap™ 300 tubes during each of the five arc fault tests are given in Table 4. The organic compounds captured with the Carbotrap™ 300, tubes and subsequently detected during analysis are listed in Table 5. The sampling flow rate was 0.05 L/min.

TABLE 4

Total Mass of Organic Compounds on Direct Air Sample onto Carbotrap ™ 300 Tubes and FireIce ® Inhibition Ratio

| Test Number & Description | Total Mass of Organics Collected on. Carbotrap ™ 300 Tubes (Front + Back) (ng) | Minimum Removal Efficiency Compared to Test 1 |
|---|---|---|
| 1 Pair of New Neoprene Jacketed Copper Cables - No FireIce ® | 158 | — |
| 2 Pair of New Neoprene Jacketed Copper Cables - FireIce ®-Added at On-Set of Arc | 65 | 2.4 |
| 3 Pair of New Neoprene Jacketed Copper Cables - FireIce ®-Added at On-Set of Arc (Repeat) | 15 | >10 |
| 4 Pair of New Neoprene Jacketed Aluminum Cables - FireIce ® Added at On-Set of Arc | None Detected | >15.8 |
| 5 Pair of New Neoprene Jacketed Aluminum Cables - FireIce ® Added Prior to Arc Generation | 10 | 15.8 |

The total organic compound concentration measured directly with the Carbotrap™ 300 tubes associated with the copper cable arc fault in Test-1 is estimated to be 1.6 mg/m3 without the application of FireIce®. For Test-2 through Test-5 the organic compound concentrations are estimated to be 0.6 mg/m3, 0.15 mg/m3, 0.0 mg/m3 and 0.1 mg/m3, respectively.

The FireIce® application is effective in reducing organic emissions for both the copper cables and the aluminum cables. The removal efficiencies estimated in Table 2 and Table 4 compare well. The application of FireIce® reduces organic emissions when applied with the arc fault is active. The presence of external contamination confirms the effective organic sampling in the vicinity of the arc fault during the five tests.

TABLE 5

Organic Compounds Identified in Direct Air Samples Collected on Carbotrap ™ 300 Tubes

| Test Number & Description | Organic Compounds Collected on Carbotrap ™ 300 Tubes | Organic Compound Mass (ng/tube) |
|---|---|---|
| 1 Pair of New Neoprene Copper Cables - No FireIce ® Added | Ethane-1-chloro-1,1 difluoro* | 53* |
| | 1-pentene, 2-methyl | 15 |
| | Benzene | 64 |
| | toluene** | 41 |
| | Styrene | 70 |
| | methyl styrene** | 217* |
| | isobutyl nitrile | 11 |
| | propane, 2-methyl-1-nitro | 14 |
| | unknown | 13 |
| 2 Pair of New Neoprene Jacketed Copper Cables - FireIce ®- Added at On-Set of Arc | 1-propene, 2-methyl | 8 |
| | 1,3 butadiene | 16 |
| | 2-butene, 2-methyl | 8 |
| | 1-pentene, 2-methyl | 23 |
| | unknown | 10 |
| 3 Pair of New Neoprene Jacketed Copper Cables - FireIce ®- Added at On-Set of Arc (Repeat) | 1-pentene, 2-methyl | 15 |
| 4 Pair of New Neoprene Jacketed Aluminum Cables - FireIce ® Added at On-Set of Arc | No organic compounds detected on both front and back Carbotrap ™ 300 tubes | 0 |
| 5 Pair of New Neoprene Jacketed Aluminum Cables - FireIce ® Added Prior to Arc Generation | No organic compounds identified on both front and back Carbotrap ™ 300 tubes | 0 |
| | Unknown peak (Front tube only) | 10 |

Notes:
*The ethane-1-chloro-1,1-difluoro is suspected to be contamination resulting from the partial decomposition of impinger train holder used during testing. The Freon HCFC 142b released during testing is the trapped blowing agent used to make the closed cell foam. The foam was used to support and secure the impinger trains. The Freon was not included in organic compound mass reported.
**The styrene and a-methyl styrene are unintentional contaminants generated from the destruction of the aerosol filter holder used during the first arc fault Test-1. The filter-holder was too close to the arc-fault zone and did not survive Test-1. The styrene values are not included in organic compound mass reported.

TABLE 6

Metals Analysis Results (PPM) Filter Pack Sampling~2 m Above Arc Fault

| Metal | Blank (Avg) | Test 2 (Cu) | Test 3 (Cu) | Test 4 (Al) | Test 5 (Al) |
|---|---|---|---|---|---|
| Al | <0.5 | 3.15 | 6.81 | 1.48 | <0.5 |
| Ca | 2.15 | 1.80 | 4.96 | 2.52 | 1.93 |
| Cu | <1.5 | 94.8 | 312 | 1.98 | <1.5 |
| Fe | <0.25 | <0.25 | 2.85 | <0.25 | <0.25 |
| K | 67 | 68 | 39 | 28 | 23 |
| Mg | 0.19 | 8.4 | 18.9 | 0.25 | <0.1 |
| Na | <2.5 | <2.5 | 5.8 | <2.5 | <2.5 |
| P | <1 | <1 | 1.2 | <1 | <1 |
| S | <1 | <1 | 3.7 | <1 | <1 |
| Si | <1 | 4.3 | 20.5 | <1 | <1 |
| Ag | <0.005 | <0.005 | 0.007 | <0.005 | <0.005 |
| As | <0.05 | <0.05 | <0.05 | <0.05 | <0.05 |
| B | <0.05 | <0.05 | <0.05 | <0.05 | <0.05 |
| Ba | 0.007 | 0.012 | 0.022 | 0.008 | 0.006 |
| Bi | <0.005 | <0.005 | <0.005 | <0.005 | <0.005 |
| Be | <0.005 | <0.005 | <0.005 | <0.005 | <0.005 |
| Cd | <0.005 | <0.005 | <0.005 | <0.005 | <0.005 |
| Co | <0.005 | <0.005 | <0.005 | <0.005 | <0.005 |
| Cr | <0.005 | <0.005 | <0.005 | <0.005 | <0.005 |
| Cs | <0.005 | <0.005 | <0.005 | <0.005 | <0.005 |
| Li | <0.005 | <0.005 | 0.013 | <0.005 | <0.005 |
| Mn | 0.005 | 0.006 | 0.053 | 0.007 | 0.006 |
| Mo | <0.005 | <0.005 | <0.005 | <0.005 | <0.005 |
| Ni | 0.010 | 0.013 | 0.024 | 0.016 | 0.011 |
| Pb | <0.005 | 1.93 | 4.79 | 0.063 | 0.015 |
| Sb | 0.003 | 2.17 | 5.19 | 0.072 | 0.017 |
| Se | <0.05 | <0.05 | <0.05 | <0.05 | <0.05 |
| Sn | 0.029 | 0.036 | 0.028 | 0.006 | 0.005 |
| Sr | 0.007 | 0.006 | 0.028 | 0.009 | 0.006 |
| Th | <0.005 | <0.005 | <0.005 | <0.005 | <0.005 |
| Ti | 0.151 | 0.122 | 0.309 | 0.007 | 0.007 |
| Th | <0.005 | <0.005 | <0.005 | <0.005 | <0.005 |
| W | <0.005 | <0.005 | <0.005 | <0.005 | <0.005 |
| Zr | <0.005 | <0.005 | <0.005 | <0.005 | <0.005 |
| V | <0.05 | <0.05 | <0.05 | <0.05 | <0.05 |
| Zn | 0.037 | 1.22 | 3.02 | 0.054 | 0.042 |
| Hg | <0.005 | <0.005 | <0.005 | <0.005 | <0.005 |
| U | <0.005 | <0.005 | <0.005 | <0.005 | <0.005 |

TABLE 7

Metals Analysis Results (PPM) from Acid Impinger Sampler Train

| Metal | MDL | Test 1 (Cu) | Test 2 (Cu) | Test 3 (Cu) | Test 4 (Al) | Test 5 (Al) |
|---|---|---|---|---|---|---|
| Al | <0.01 | 0.145 | 0.272 | 0.330 | 0.328 | 0.640 |
| Ca | <0.01 | 0.485 | 1.30 | 0.388 | 0.523 | 0.094 |
| Cu | <0.01 | 0.22 | 0.918 | 0.816 | 0.66 | 0.062 |
| Fe | <0.005 | 0.02 | 0.056 | 0.023 | 0.028 | 0.025 |
| K | <0.01 | 1.24 | 0.896 | 0.644 | 77.8 | 13000 |
| Mg | <0.002 | 0.042 | 0.134 | 0.056 | 0.318 | 0.012 |
| Na | <0.05 | 0.951 | 0.727 | 1.78 | 0.905 | 10.5 |
| P | <0.02 | <0.02 | 0.049 | <0.02 | <0.02 | <0.02 |
| S | <0.05 | 0.043 | 0.070 | 0.099 | 0.043 | 0.504 |
| Si | <0.1 | 0.303 | 0.48 | 1.10 | 0.49 | 21.4 |
| Ag | <0.0001 | 0.004 | 0.005 | 0.004 | 0.005 | 0.002 |
| As | <0.001 | <0.001 | <0.001 | <0.001 | <0.001 | <0.001 |
| B | <0.025 | 0.853 | 0.638 | 1.61 | 0.922 | 2.88 |
| Ba | <0.0001 | 0.006 | 0.008 | 0.007 | 0.006 | 0.002 |
| Bi | <0.001 | <0.001 | <0.001 | <0.001 | <0.001 | <0.001 |
| Be | <0.001 | <0.001 | <0.001 | <0.001 | <0.001 | <0.001 |
| Cd | <0.0001 | <0.0001 | <0.0001 | <0.0001 | 0.0002 | <0.0001 |
| Co | <0.0001 | 0.0001 | 0.0004 | <0.0001 | 0.0002 | 0.0001 |
| Cr | <0.0001 | 0.0007 | 0.0009 | 0.0006 | 0.0006 | 0.019 |
| Cs | <0.0001 | <0.0001 | <0.0001 | <0.0001 | 0.002 | 0.819 |
| Li | <0.001 | <0.001 | <0.001 | <0.001 | <0.001 | 0.004 |
| Mn | <0.0001 | 0.001 | 0.002 | 0.0006 | 0.0010 | 0.015 |
| Mo | <0.0001 | 0.0002 | 0.0002 | 0.0003 | 0.0002 | 0.0020 |
| Ni | <0.0001 | 0.002 | 0.001 | 0.002 | 0.002 | 0.001 |
| Pb | <0.0001 | 0.003 | 0.003 | 0.008 | 0.009 | 0.008 |
| Sb | <0.001 | 0.002 | 0.002 | 0.007 | 0.003 | <0.001 |
| Se | <0.001 | <0.001 | <0.001 | <0.001 | <0.001 | 0.004 |
| Sn | <0.0001 | 0.0004 | 0.0003 | 0.0002 | 0.0005 | 0.0020 |
| Sr | <0.0001 | 0.002 | 0.005 | 0.002 | 0.003 | 0.001 |
| Th | <0.0001 | <0.0001 | <0.0001 | <0.0001 | <0.0001 | <0.0001 |
| Ti | <0.0001 | 0.001 | 0.004 | 0.002 | 0.002 | 0.014 |
| Tl | <0.0001 | <0.0001 | <0.0001 | <0.0001 | <0.0001 | <0.0001 |
| W | <0.0001 | <0.0001 | <0.0001 | <0.0001 | 0.0001 | 0.037 |
| Zr | <0.0001 | 0.0002 | 0.0008 | 0.0007 | 0.0007 | 0.027 |
| V | <0.0001 | <0.0001 | <0.0001 | <0.0001 | <0.0001 | 0.0002 |
| Zn | <0.0001 | 0.01 | 0.009 | 0.01 | 0.021 | 0.003 |
| Hg | <0.0001 | <0.0001 | <0.0001 | <0.0001 | <0.0001 | <0.0001 |
| U | <0.0001 | <0.0001 | <0.0001 | <0.0001 | <0.0001 | <0.0001 |

A 2-liter air sample was taken through a filter pack at about 2 meters above each arc test. Each available exposed filter was analyzed for metals and other elements. The results for 38 element analyses are presented in Table 6.

Some key observations are noted from filter analysis for the Test-2 through Test-5 data available in Table 6: A key result noted is the below detection of aluminum for Test 5 compared to a measurable detection in Test 4. Both tests used new aluminum cables for the arc fault but in the Test 5 case the fault zone was encapsulated in FireIce® prior to arc fault generation whereas for Test 4 the arc fault was initiated into air and then FireIce® was added to quench the arc fault. The lead (Pb), antimony (Sb), magnesium (Mg), copper (Cu), and calcium (Ca) results add confirmation to the reduction of released metals with the arc fault encapsulated.

The counter ion for FireIce® is potassium (K). For all four arc fault tests, the filter analysis did not detect potassium above the nominal background concentration of potassium present on the filter prior to exposure. This is evidence that FireIce® did not undergo detectable degradation during the arc faults where FireIce® was applied.

Test 2 and Test 3 were essentially duplicate tests using new neoprene jacketed copper cables for the arc fault with Test 3 having the more sustained arc fault. The procedure for applying FireIce® was the same for both tests. At the on-set of the arc fault the addition of FireIce® was begun and continued until the concrete cell was about full. For the more sustained arc fault (Test 3) the key metals from the vaporized copper cable as measured with the filter pack were about 3 to 4 times higher than the metals released in the much shorter arc period of Test 2. Key metals released were aluminum (1.7%), copper (80%), magnesium (4.8%), zinc (0.8%), lead (1.2%), calcium (1.3%) and antimony (1.3%) with remaining components at <1% to only present at trace levels.

The estimated airborne total metals concentration for Test 3 is 0.17 $g/m^3$ and for Test 2 is 0.058 $g/m^3$. Similarly for the aluminum cables the estimated airborne total metals concentration for Test 4 is 0.003 $g/m^3$ and for Test 5 is 0.001 $g/m^3$.

For comparison the Ontario Ministry of Labor time-weighted average exposure concentration (TWAEC) for a variety of fumes and particulate, ranges from 0.003 to 0.01 $g/m^3$ for 40-hr work week and for short term exposures, the particulate concentrations range from 0.005 to 0.02 $g/m^3$ for a maximum 15 minute continuous exposure depending on the fume and particulate present.

Observations from the metals train analysis for Tests 1 through 5 are summarized below and are based on the metal/element analysis data present in Table 7.

The high level of potassium in the Test 5 results were from the entrainment of airborne FireIce® into the first impinger as the arc generated gas that ejected some of the FireIce® material into the air. This is confirmed by the increase in silica, sodium and sulfur.

For Test 4 a significant level of copper (0.66 ppm) is measured as copper residue from Tests 1 to 3 is released during the aluminum cable arc fault. However in Test 5 very little copper is detected (>10× less detected 0.062 ppm) with the FireIce® encapsulating the arc fault zone. This also confirmed by the similar reduction in magnesium detected.

The impinger samples collected similar amounts of metals for the copper cable arc fault tests. The metal concentration levels were and are given in Table 7.

The application of FireIce® to neoprene jacketed copper and aluminum cables is effective in reducing airborne organic compounds and also airborne metals. Removal efficiencies from 2 times to greater than 15 times can be expected when added to an active arc fault. For a FireIce® encapsulated arc fault greater than 60 times removal of metals and arc generated arc products is possible based on the five tests performed. The optimum admixture is ratio of 100 grams of FireIce to 2.5 gallons of clean clear water.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A wind turbine fire suppression system constructed and arranged to suppress a fire within a shielded cabinet housing wind turbine machinery comprising:
    a sealed container capable of holding pressurized non-conductive hydrated super absorbent polymer;
    a predetermined amount of admixture of non-conductive hydrated super absorbent polymer stored within said container;
    at least one charging cylinder coupled to said sealed container for pressurization of said container storing said admixture;
    a plurality of distribution nozzles fluidly connected to said sealed container strategically positioned and constructed and arranged to spray said admixture on the machinery of said wind turbine;
    at least one sensor for detecting fire ignition and means for releasing said stored admixture of non-conductive hydrated super absorbent polymer onto said machinery; and
    whereby said admixture formulated to provided fire suppression and encapsulate noxious and toxic gases thereby reducing organic and metal emissions.

2. The wind turbine fire suppression system according to claim 1 wherein said nozzles are directed to spray pattern of said admixture over a wind turbine control cabinets, generator, gearbox and bearings.

3. The wind turbine fire suppression system according to claim 1 wherein admixture is potassium based and hydrated at a level to make a non-conductive admixture.

4. The wind turbine fire suppression system according to claim 1 wherein admixture is sodium based and hydrated at a level to make a non-conductive admixture.

5. The wind turbine fire suppression system according to claim 1 wherein said admixture is biodegradable.

6. The wind turbine fire suppression system according to claim 1 wherein said discharged admixture is formulated to create a non-conductive residual byproduct that can be vacuumed.

7. A method of suppressing a fire within a shielded cabinet housing wind turbine machinery comprising:
   providing a sealed container capable of holding pressurized non-conductive hydrated super absorbent polymer;
   adding a predetermined amount of admixture of said non-conductive hydrated super absorbent polymer to said sealed container;
   providing at least one charging cylinder coupled to said sealed container for pressurization of said seal container;
   fluidly connecting to said sealed container a plurality of distribution nozzles constructed and arranged to spray said non-conductive admixture on the machinery of said wind turbine; and
   connecting at least one sensor for detecting fire ignition constructed and arranged to cooperate with a means for releasing said stored non-conductive admixture of hydrated super absorbent polymer upon the sensor detecting a fire ignition.

8. The method of suppressing a wind turbine machinery fire according to claim 7 wherein admixture is potassium based and hydrated at a level to make a non-conductive admixture.

9. The method of suppressing a wind turbine machinery fire according to claim 7 wherein admixture is sodium based and hydrated at a level to make a non-conductive admixture.

10. The method of suppressing a wind turbine machinery fire according to claim 7 wherein said admixture is biodegradable.

11. The method of suppressing a wind turbine machinery fire according to claim 7 wherein said admixture formulated to provided fire suppression and encapsulate noxious and toxic gases thereby reducing organic and metal emissions.

* * * * *